Patented Sept. 5, 1939

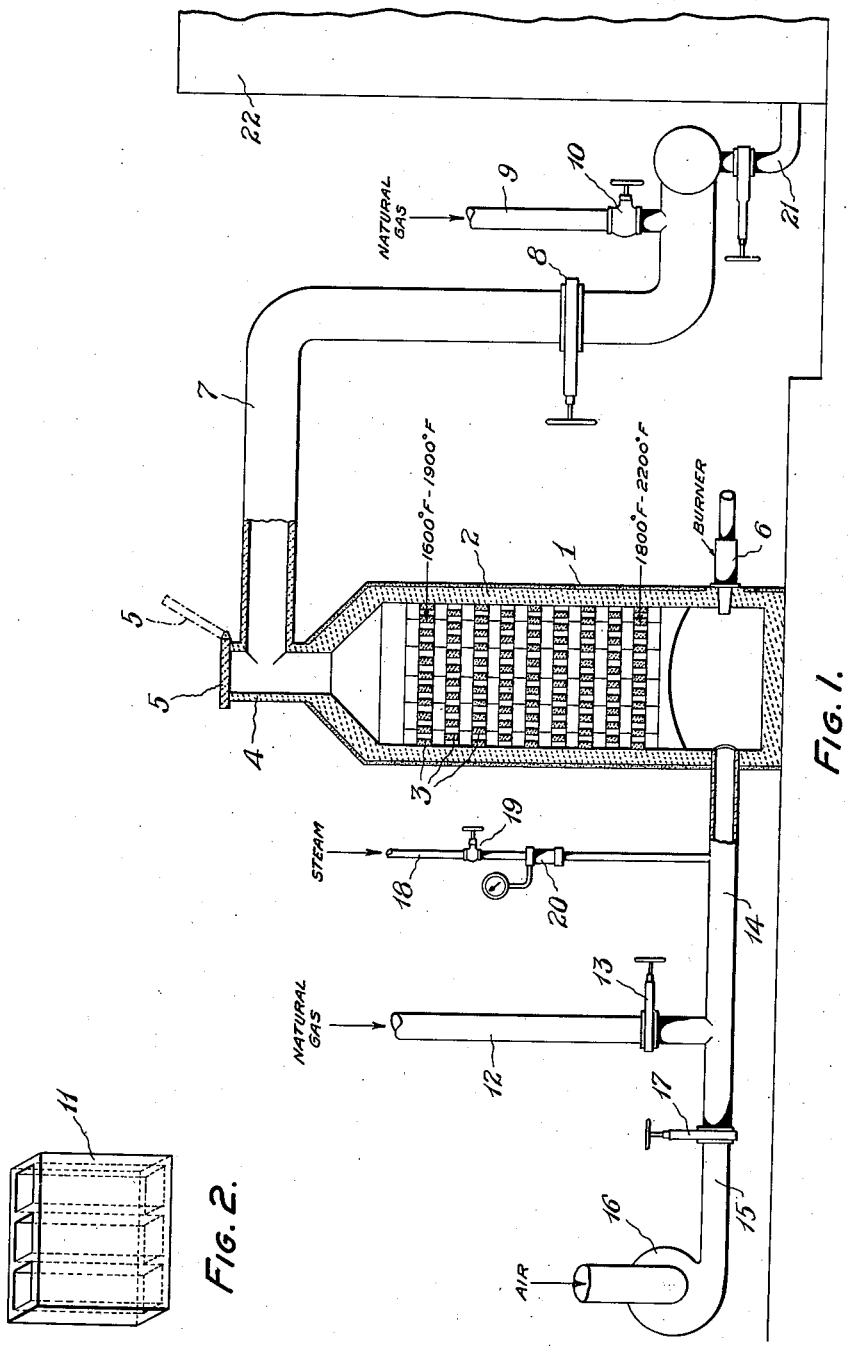

2,172,106

UNITED STATES PATENT OFFICE 2,172,106

CONTINUOUS PROCESS OF GAS MAKING

George M. Parker, St. Louis, Mo.

Original application September 11, 1934, Serial No. 743,573. Divided and this application January 20, 1939, Serial No. 251,988

7 Claims. (Cl. 48—196)

My invention particularly relates to processes of continuously making gas of comparatively low B. t. u. heating value for immediate use in the heating of soaking pits, open hearth furnaces, roasting furnaces, and analogous purposes, in which gas of low B. t. u. heating value is desired, or for the stabilization of gas heating values. The gas of comparatively low B. t. u. heating value that is obtained by my improved process is made by reforming gas of comparatively high B. t. u. heating value, preferably natural gas, in the manner hereinafter fully described. Although the invention may be practiced, with or without the use of steam, the claims in this application are limited to the improved continuous processes of gas-making in which steam is utilized. The invention also includes improved apparatus by means of which the improved processes of continuous gas-making may be carried out.

The subject matter of this application has been divided out of my pending application Serial No. 743,573, filed September 11, 1934, Continuous processes of gas-making.

My invention distinguishes from previous practice in which gas of lower B. t. u. heating value, such as producer gas, has been made for the heating of soaking pits, open hearth furnaces, roasting furnaces, and analogous purposes, or for the purpose of stabilizing gas heating values, in that by my improved apparatus and process the low B. t. u. gas is made continuously for immediate use, and not produced intermittently for storage, in whole or in part, in a holder; and, furthermore, the heating, by which the reforming of the gas is effected by my invention, is applied internally of the converting vessel, so that all resultant products are carried forward with the gas produced and there are no losses except the loss of some radiated heat. In other words, there are no external heat losses, except the comparatively slight loss through radiation from the apparatus.

The annexed drawing and the following description set forth in detail certain means embodying my invention, and certain steps for carrying out the improved process features thereof, such disclosed means and steps constituting, respectively, however, but one of the various forms in which the principle of the improved apparatus may be embodied and but a few of the various series of steps by which the improved process may be carried out.

In said annexed drawing:

Figure 1 is a representation of means embodying one form of my improved apparatus and by the use of which by improved process may be worked; and Figure 2 is a perspective view of a hollow checker-tile which exemplifies one form of a heat-transfer medium forming part of my improved apparatus and utilized in working my improved process.

Referring to the annexed drawing, the gas reformation effected by my improved apparatus takes place in an insulated vessel 1 lined with fire-brick 2 and provided with an interior heat-transfer medium such as the checker-brick structure 3. One preferred form of the checker structure 3 is made from hollow checker-tile 11 of fire clay, illustrated in Figure 2. The vessel 1 is provided adjacent one end with a stack outlet 4 having a stack-valve 5. A gas burner 6 for heating the checker-brick structure 3 communicates with the vessel 1 adjacent the other end thereof. A fire-brick-lined discharge outlet 7 communicates with the interior of the stack outlet 4, is controlled by a valve 8, and leads to the point of use of the gaseous products produced in the vessel 1, for instance, to the burners of a soaking pit 22, one of which, 21, is shown in Figure 1. Communicating with the discharge outlet 7 is a conduit 9 through which gas of comparatively high B. t. u. heating value may be supplied to the outlet 7 from any suitable source (not shown), the conduit 9 being controlled by a valve 10. The purpose of the conduit 9 will be hereinafter fully explained.

Gas and air are supplied to the vessel 1, and also steam in some instances, to effect the gas reformation and the gas-making hereinafter fully described. This application is particularly directed to that working of my improved process in which steam is utilized. One suitable assembly of apparatus for supplying such gas and air, and steam, will now be described.

Communicating with the interior of the vessel 1 adjacent the end thereof into which the burner 6 fires is a mixture tube 14 into which gas of comparatively high B. t. u. heating value, preferably natural gas of approximately 1000 B. t. u. heating value, is conducted from a source (not shown) by a conduit 12 controlled by a valve 13. Also communicating with the mixture tube 14 is a conduit 15 controlled by a valve 17 and into which air is forced by a blower 16. Also communicating with the mixture tube 14 is a steam line 18 controlled by a valve 19, the setting of this valve 19 being determined by the amount of steam per minute which is desired, if steam is being used in the process, the actual amount of steam per minute being furnished being indicated by a meter 20. In the process claimed in this application steam is utilized. The air forced into the mixture tube 14 by the blower 16 may be either of atmospheric temperature or preheated.

When using the above-described apparatus, in carrying out my improved process, the checker-brick 3 is first heated by the burner 6 until the temperature of the checker-brick 3 is raised to from 1800° to 2200° F. in the area thereof toward the receiving end of the vessel 1 and to 1600° to 1900° F. in the area thereof toward the discharge end of the vessel 1, one suitable set of temperature conditions being 2000° F. in the receiving area and 1800° F. in the discharge area. During such preliminary heating of the checker-brick 3, the valves 8, 10, 13, 17, and 19 are closed, and the stack valve 5 is open, as indicated by the dotted line position of the valve 5 in the accompanying drawing. Valves 8, 10, and 19 remain closed during a preliminary adjustment of the air and gas mixture which is admitted through the mixing tube 14 by the opening of the valves 13 and 17, after the checker-brick 3 has been heated to the desired temperatures. When the desired temperatures have been obtained and the proper mixture adjustment made, the valve 8 is opened and the stack valve 5 is closed and natural gas through the conduit 12 and air through the conduit 15 are fed to the mixing tube 14, and hence to the vessel 1, in a ratio of from substantially two and one-half (2½) volumes of air to one (1) volume of natural gas to substantially four (4) volumes of air to one (1) volume of natural gas. The reason for the range of variation in the ratio of air to gas is that, when the said mixture of air and gas enters the vessel 1, part of the natural gas, which is of substantially 1000 B. t. u. heating value, is burned by the air, the balance of the natural gas being reformed into gases of substantially lower B. t. u. heating value, such as B. t. u. heating values of from 500 to 900, with the formation of some carbon. When it is desired that the carbon so formed, or a portion thereof, shall be burned by air, the ratio by volume of air to natural gas fed to the vessel 1 is substantially four (4) to one (1). However, if it is desired to use part or all of this carbon to produce some blue water gas, the ratio by volume of air to natural gas fed to the vessel 1 is substantially two and one-half (2½) to one (1), and the by-product carbon formed during the described reformation is caused to react with the proper amount of steam admitted through the steam line 18, thus to form blue water gas, which is a working of my improved process to which the claims of this application are particularly directed. A portion of the carbon formed during the reformation of a part of the natural gas may be carried out of the vessel 1 with the resultant gases as finely divided free carbon.

When it is stated that the "balance" of the gas is reformed, it is not meant that all of said balance is cracked or reformed in the vessel 1 for unquestionably some small part passes unchanged through the vessel 1 and appears in its original state as part of the resultant products issuing from the vessel 1 via the conduit 7.

During the operation of the device and the practice of the process by which part of the natural gas is formed and the balance is reformed, as stated, the burner 6 is continuously operated to the extent necessary to maintain the desired temperature conditions in the checker-brick 3 and to serve as an ignition burner for the air and gas mixture. The heat supplied from an external source and applied internally to the vessel 1 by means of the burner 6, which internal heating is carried on simultaneously with the bringing in to the vessel of the natural gas to be reformed, prevents the reaction zone from gradually receding from the point of highest temperature and prevents the incoming cold mixture from unduly cooling the heat-transfer medium and thus necessitating the halting of the process while the heat-transfer medium is again brought up to suitable reaction temperatures. Thus, applicant's improved process can be continuously worked to make the final products desired.

The net result of the described operations is the formation of resultant gases in greater volume than that of the original natural gas and of from 120 to 160 B. t. u. heating value. That is, the reformed gas of B. t. u. heating value of from 500 to 900 and the blue water gas are averaged down or diluted by the dead burned gas to the B. t. u. value of from 120 to 160, a value which is suitable for the purposes above-mentioned. If the working of the process is such that a part of the carbon is carried out with the resultant gases as finely divided free carbon, then when the resultant gases are burned, a flame of high luminosity is produced, a result which is very desirable in many heating operations.

My improved process is so worked that the resultant gases issuing from the vessel 1 are produced in basic amounts for the apparatus that is being fired and in the desired volume and heating value. Any desired additions to the thermal value are cared for by adding a variable amount of straight natural gas to the reformed gas. For this purpose, there are provided the conduit 9 and the valve 10 which permit enrichment of the reformed gas by straight natural gas as desired.

An object of the invention is continuous operation for immediate use, and to this end the resultant gases of the stated comparatively low B. t. u. heating value are substantially immediately conducted by the conduit 7 to the point of use, for instance, to the burners of a soaking pit 22, one of which, 21, is shown in Figure 1, such cooling, scrubbing, and other well-known prior gas conditioning operations being effected as the particular conditions require.

My co-pending application, Serial No. 34,149, filed August 1, 1935, discloses related subject matter in connection with gas-fired regenerative furnaces.

What I claim is:

1. A continuous process of gas making consisting in, preliminarily heating a heat-transfer medium in a vessel to from 1600° to 2200° F.; and then applying heat to said medium internally of the vessel and conducting hydrocarbon gas of high B. t. u. heating value and air into the vessel and into contact with the heat-transfer medium, the ratio of gas to air being such as to effect the burning of part of the gas by the air and the reforming of the balance of the gas into gas of comparatively low B. t. u. heating value, with the formation of some carbon, and concurrently admitting steam to the vessel for reaction with said carbon to form blue water gas, with the formation of final products of a B. t. u. heating value corresponding to that of producer gas, the above-mentioned internal heating being to such an extent as is necessary to maintain the said temperature conditions and to effect the aforementioned results.

2. A continuous process of gas making consisting in, preliminarily heating a heat-transfer medium in a vessel to from 1600° to 2200° F.; and then applying heat to said medium internally of the vessel and conducting natural gas and air into the vessel and into contact with the heat-transfer medium, the ratio of gas to air being such as to effect the burning of part of the gas by the air and the reforming of the balance of the gas into gas of lower B. t. u. heating value than natural gas, with the formation of some carbon, and concurrently admitting steam to the vessel for reaction with said carbon to form blue water gas, with the formation of final products of a B. t. u. heating value corresponding to that of producer gas, the above-mentioned internal heating being to such an extent as is necessary to maintain the said temperature conditions and to effect the aforementioned results.

3. A continuous process of gas making consisting in, preliminarily heating a heat-transfer medium in a vessel to from 1600° to 2200° F.; and then applying heat to said medium internally of the vessel and conducting hydrocarbon gas of high B. t. u. heating value and air into the vessel and into contact with the heat-transfer medium, the ratio of gas to air being such as to effect the burning of part of the gas by the air and the reforming of the balance of the gas into gas of comparatively low B. t. u. heating value, with the formation of some carbon, and concurrently admitting steam to the vessel for reaction with said carbon to form blue water gas, with the formation of final products of a B. t. u. heating value of approximately from 120 to 160, the above-mentioned internal heating being to such an extent as is necessary to maintain the said temperature conditions and to effect the aforementioned results.

4. A continuous process of gas making consisting in, preliminarily heating a heat-transfer medium in a vessel to from 1600° to 2200° F.; and then applying heat to said medium internally of the vessel and conducting hydrocarbon gas of high B. t. u. heating value and air into the vessel and into contact with the heat-transfer medium, the ratio of gas to air being such as to effect the burning of part of the gas by the air and the reforming of the balance of the gas into gas of comparatively low B. t. u. heating value, with the formation of some carbon, and concurrently admitting steam to the vessel in an amount suitable for reaction with part of said carbon to form blue water gas, with the formation of final products of a B. t. u. heating value corresponding to that of producer gas and including finely divided free carbon, the above-mentioned internal heating being to such an extent as is necessary to maintain the said temperature conditions and to effect the aforementioned results.

5. A continuous process of gas making consisting in, preliminarily heating a heat-transfer medium in a vessel to from 1600° to 2200° F.; and then applying heat to said medium internally of the vessel and conducting natural gas and air into the vessel and into contact with the heat-transfer medium, the ratio of gas to air being substantially one (1) to two and one-half (2½), resulting in the reforming of a part of the natural gas into gas of lower B. t. u. heating value than natural gas, with the formation of some carbon, and the burning of the balance of the natural gas, and concurrently admitting steam to the vessel for reaction with said carbon to form blue water gas, with the formation of final products of a B. t. u. heating value corresponding to that of producer gas, the above-mentioned internal heating being to such an extent as is necessary to maintain the said temperature conditions and to effect the aforementioned results.

6. A continuous process of gas making consisting in, preliminarily heating a heat-transfer medium in a vessel to from 1600° to 2200 F.; then applying heat to said medium internally of the vessel and conducting natural gas and air into the vessel and into contact with the heat-transfer medium, the ratio of gas to air being such as to effect the burning of part of the gas by the air and the reforming of the balance of the gas into gas of lower B. t. u. heating value than natural gas, with the formation of some carbon, and concurrently admitting steam to the vessel for reaction with said carbon to form blue water gas, with the formation of resultant products of a B. t. u. heating value of approximately from 120 to 160, the above-mentioned internal heating being to such an extent as is necessary to maintain the said temperature conditions and to effect the aforementioned results; and then effecting controlled introduction of natural gas for mixture with the above-mentioned resultant products to vary the composition and B. t. u. heating value of the final products.

7. A continuous process of gas making consisting in, preliminarily heating a heat-transfer medium in a vessel to from 1600° to 2200° F.; then applying heat to said medium internally of the vessel and conducting hydrocarbon gas of high B. t. u. heating value and air into the vessel and into contact with the heat-transfer medium, the ratio of gas to air being such as to effect the burning of part of the gas by the air and the reforming of the balance of the gas into gas of comparatively low B. t. u. heating value, with the formation of some carbon, and concurrently admitting steam to the vessel in an amount suitable for reaction with part of said carbon to form blue water gas, with the formation of resultant products of a B. t. u. heating value corresponding to that of producer gas and including finely divided free carbon, the above-mentioned internal heating being to such an extent as is necessary to maintain the said temperature conditions and to effect the aforementioned results; and then effecting controlled introduction of natural gas for mixture with the above-mentioned resultant products to vary the composition and B. t. u. heating value of the final products.

GEORGE M. PARKER.